United States Patent [19]

Van Campenhout et al.

[11] Patent Number: 4,543,615

[45] Date of Patent: Sep. 24, 1985

[54] AUTOMATIC SCANNING DEVICE AND ITS CONTROL FOR OPTO-MECHANICAL PROCESSING APPLICATIONS

[75] Inventors: Jan Van Campenhout, Grimbergen; Hans de Stecker, Lochristi; Paul Notredame, Wondelgem; Eddy Muyle, Pittem; Jean-Paul Bergmans, Merelbeke; Patrick Bergmans, Zwijnaarde, all of Belgium

[73] Assignee: Digitized Information Systems Corp., n.v., Ghent, Belgium

[21] Appl. No.: 501,152

[22] Filed: Jun. 6, 1983

[30] Foreign Application Priority Data

Jun. 4, 1982 [LU] Luxembourg .............................. 84183

[51] Int. Cl.⁴ .............................................. H04N 1/04
[52] U.S. Cl. .................................... 358/285; 358/297; 318/135; 310/13
[58] Field of Search ............... 358/256, 295, 286, 300, 358/293, 297, 294, 296, 302; 318/135; 310/12, 13

[56] References Cited

U.S. PATENT DOCUMENTS

| | | | |
|---|---|---|---|
| 3,816,659 | 6/1974 | Landsman | 358/290 |
| 4,131,916 | 12/1978 | Landsman | 358/290 |
| 4,415,911 | 11/1983 | Tazaki | 318/135 |
| 4,445,798 | 5/1984 | Munehiro | 318/135 |
| 4,476,496 | 10/1984 | Thaler | 358/296 |

*Primary Examiner*—Howard W. Britton
*Assistant Examiner*—Edward L. Coles
*Attorney, Agent, or Firm*—Antonelli, Terry & Wands

[57] ABSTRACT

In scanning devices used for opto-mechanical processing of a substrate covered with a photo-sensitive material, it is highly desirable to be able to achieve accurate control of the carriage utilized for scanning the substrate. To accomplish this, the carriage is moved along a rectilinear guide by use of a linear motor, preferably under computer control. The linear motor includes a winding which is composed of a number of isolated conductors attached to the rectilinear guide orthogonally to the longitudinal axis of the guide. The winding is connected to the control computer through a controllable current source. The linear motor also includes a solid-state commutator coupled to magnetically propel the carriage in accordance with current supplied to the winding from the controllable current source based on instructions from the control computer.

25 Claims, 5 Drawing Figures

AUTOMATIC SCANNING DEVICE AND ITS CONTROL FOR OPTO-MECHANICAL PROCESSING APPLICATIONS

BACKGROUND OF THE INVENTION

The invention presented here concerns a scanning device suited for the opto-mechanical processing of a substrate covered with photo-sensitive material, using optical components supported by a mobile carriage which moves along a rectilinear guide.

The invention finds numerous applications in the area of printing, cartography, medical imaging for the generation of graphical documents, as well as for the input and analysis of such documents, including for the purpose of converting the information of these documents into a digital form.

There presently exist photocomposition devices, in which a drum covered with a photo-sensitive sheet is scanned by a narrow light bean reflected by a mirror supported by a carriage or a slide. This carriage or slide is actuated by a lead screw, which, in turn, is driven by an electric motor. The primary drawback of such a carriage positioning system is the lack of positioning precision of the carriage or slide, as a consequence of mechanical vibrations, backlash and wear.

There also exist scanning devices in which a narrow light beam explores a sheet by scanning the latter point-by-point, in a linear fashion, and transferring, as a function of the beam position, the optical information to a computer which directs the analyzing beam.

In those known machines or devices, the scanning element, consisting of said carriage or slide, is actuated by means of lead screws. The accuracy required, which is of the order of 1 micrometer, renders both the construction and the positioning control of these positioning systems complex and expensive. Furthermore, mechanical lead screws incur mechanical wear, resulting in backlash and poor carriage positioning accuracy.

SUMMARY OF THE INVENTION

An object of the present invention is to remedy the above drawbacks of mechanical lead screws.

A further object of the present invention is to provide an improved automatic scanning device for the opto-mechanical processing of a substrate.

To accomplish these and other objects, the present invention provides an automatic scanning device suited for the opto-mechanical processing of a substrate covered with photo-sensitive material, by means of optical components supported by a mobile carriage moving along a rectilinear guide. The invention consists mainly of a light source which generates the synthesizing or analyzing beam; optical components for directing and focusing the beam generated by this light source onto a substrate; a computer; an optical position measuring device; and a linear motor composed of an electrical winding consisting of a number of isolated conductors, attached onto the rectilinear guide and orthogonal to the direction of motion. By means of a modulated current source and a solid-state electronic commutator, the computer controls the current through the winding conductors, so as to propel the carriage which is equipped with at least one permanent magnet.

The support of the substrate consists of a cylindrical drum rotating around its central axis. In a particular realization, the carriage is supported by at least one contactless bearing, preferably with pneumatic suspension.

In a particular realization of the linear motor, the winding is realized as a two-layer printed circuit board bearing two series of S-shaped patterns, one series on each side of the board, separated by a thin isolating layer formed from a rectilinear guide with high magnetic permeability, to which the winding is attached.

The position measuring device is preferably an optical grating allowing a measurement accuracy of the order of 1 micrometer, and capable of transmitting its data to the computer mentioned above.

The invention also concerns a signal processing method for the opto-mechanical processing of a substrate covered with photo-sensitive material in a device as described above, primarily characterized by the fact that said carriage is positioned by means of a linear motor consisting of permanent magnets and a stationary winding in which a computer-controlled current is established.

The carriage position can be controlled with satisfactory results by means of, for example, an optical measuring device of the type manufactured under the brand HEIDENHAIN, consisting of an optical grating with a resolution of 1 micrometer, transmitting its data to the computer.

Particularly, in this invention the linear motor winding is realized using printed circuit board technology, on a thin layer of isolating material clad on both sides with a conducting material in which a pattern of conductors is engraved, orthogonal to the axis of the rectilinear guide. To that end, both sides of a doubly copper-clad epoxy board are etched into a series of identical S-shaped patterns, connected by "plating-through" at the extremities, so as to form a winding which is glued on the rectilinear guide.

Other particularities and details of the present invention will become apparent in the description of the attached drawings which, schematically and by no means restrictively, represent a particular realization of a device for the opto-mechanical processing of substrates according to the invention.

BRIEF DESCRIPTION OF THE DRAWINGS

In these various drawings, the same reference symbols refer to identical or similar objects.

DETAILED DESCRIPTION

Figure 1:
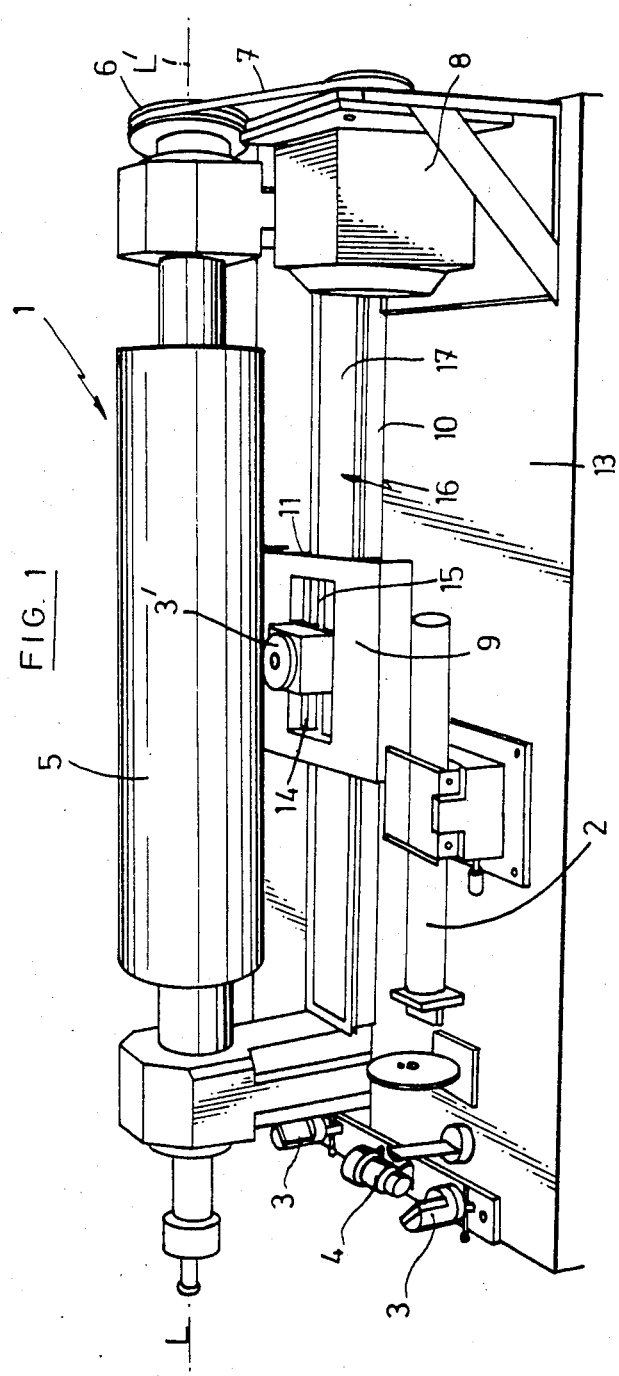
FIG. 1 shows a perspective view of an automatic scanning device according to the invention.
Figure 2:
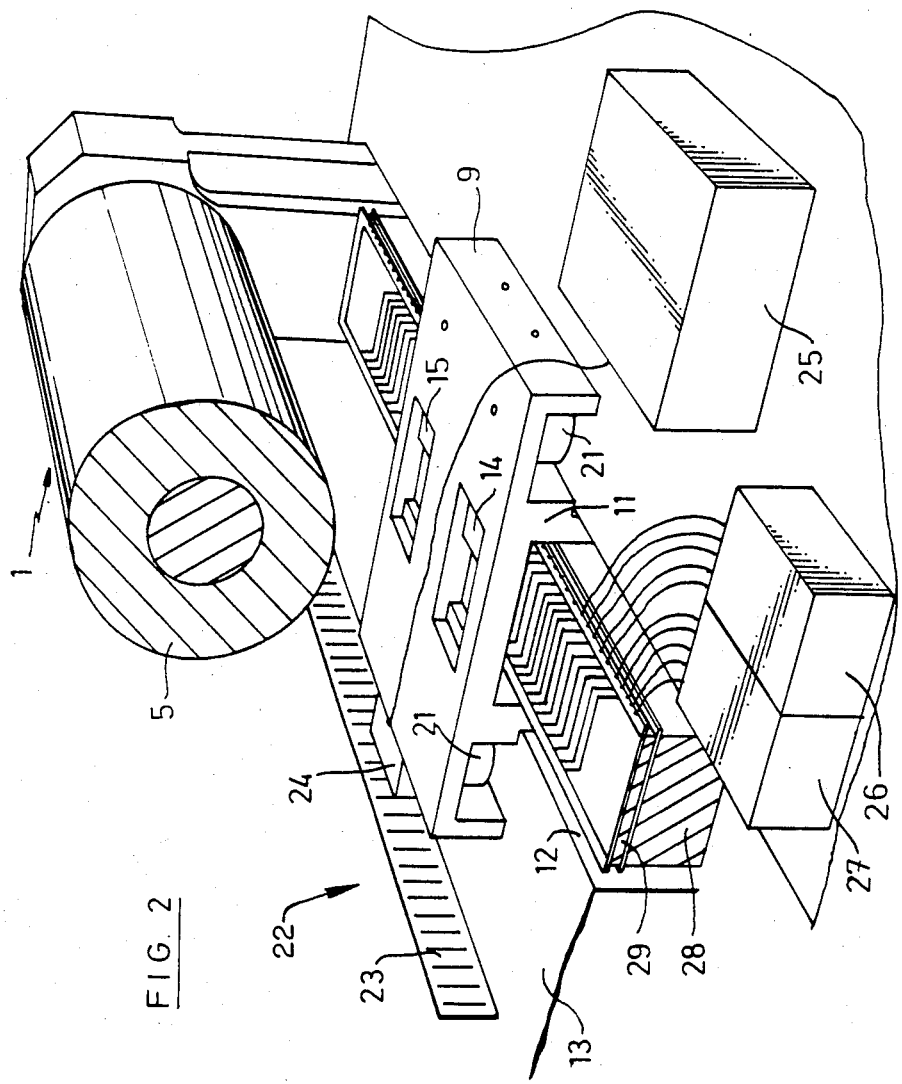
FIG. 2 shows a perspective view of the scanning carriage of the device shown in FIG. 1.

As shown in FIG. 1, the automatic scanning device of the invention, referred to in its entirety by reference numeral 1, and intended for the opto-mechanical treatment of substrates covered with photo-sensitive material, contains a light source 2 generating a light beam, for instance a laser source and optical components consisting of mirrors 3 and a lens 3' intended to direct and focus the light beam of the laser source 2 onto a support 5. A beam expander 4 widens the light beam. The support consists of a cylindrical drum 5, rotating about its central axis LL' by means of a pulley 6 and a belt 7 driven by a motor 8. A scanning carriage 9 movable along a rectilinear guide 10 directs the laser beam point-by-point onto the drum 5. The link between the carriage 9 and the rectilinear guide 10 is realized by means of lateral protrusions 11 of the carriage 9 lodged in a slot 12 of a granite base 13 (see FIG. 2). The lateral protrusions 11 of the carriage 9 is equipped with two RES or FERRITE magnet assemblies 14 and 15 aligned with the winding pitch. These magnet groups 14 and 15 compose the mobile part of a linear motor intended to actuate the carriage 9. The linear motor is referred to in its entirety by reference numeral 16. It contains a winding 17 consisting of a series of isolated conductors 18 (see FIG. 5), etched according to printed circuit techniques into a thin copper-clad epoxy strip 19 which is attached to a back iron with a thickness of approximately 1 cm made of a highly-permeable soft magnetic material, for instance soft iron.

Each of the conductors 18 is connected to a current source 27 controlled by a computer 25. In this way, one can excite each of the conductors 18 in a preprogrammed way to propel the carriage 9.

The linear motor 16 allows accurate positioning of the carriage 9 along the rectilinear guide 10 provided the conductors 18 forming the winding loops are sufficient in number. No mechanical contact whatsoever is necessary, and the carriage guidance can be realized by means of pneumatic bearings, even if the carriage weight exceeds 10 kilograms.

An optical measuring device, referred to in its entirety by reference numeral 22, consists of a grating (which can be of the type manufactured under the brand HEIDENHAIN) 23, attached to the base 13. This grating 23 has a resolution of 1 micrometer. An optical detector 24 attached to the scanning carriage allows the positioning of the latter with a precision of the order of 2 micrometers.

The detector 24 transmits pulses which signal its position to a computer 25 linked to a solid state commutator 26 and a controllable current source 27. The output signal of the detector 24 is digital, and is processed by a real-time control algorithm in the computer 25 which allows transforming the digital output signal into an excitation of the winding current, through the controllable current source and the solid-state commutator.

The computer 25 guides the carriage 9 from one end of the rectilinear guide 10 to the other, with a speed which is based on the drum rotational speed. The control computer 25 controls and steers the excitation current. It allows the implementation of a doubly-integrating control algorithm. Simultaneously, a second computer (not shown) modulates the laser light beam in accordance with known laser light control techniques to project the desired image onto the rotating drum.

The transfer function of the position control algorithm utilized in a preferred embodiment of the present invention is a rational function of S as follows:

$$G(S) = \frac{K * (1 + S*Td)}{(S**2) * (1 + x*S*Td)}$$

where
S is the Laplace variable
Td is a differentiation constant
x is a small constant not exceeding 0.05
* denotes multiplication
** denotes exponentiation This transfer function represents a digital control algorithm. It is realized on the computer 25 in accordance with known programming principle, under the form of a recursive digital filter approximating the above transfer function, running in discrete time with a sampling rate of about 1 kHz. Using a doubly-integrating control algorithm eliminates steady-state errors, even with a ramp reference input. The use of a control computer 25 to implement the control algorithm permits the use of modern adaptive techniques taking into account the real dynamics of the carriage 9.

The base 13 of the machine 1 is made of polished granite. Longitudinal slots 12 are machined in the base to define a rectilinear guide 28 bearing the winding 17 of the linear motor 16 and a yoke 29 of soft iron on which winding 17 of the linear motor 16 is glued.

Figure 3:
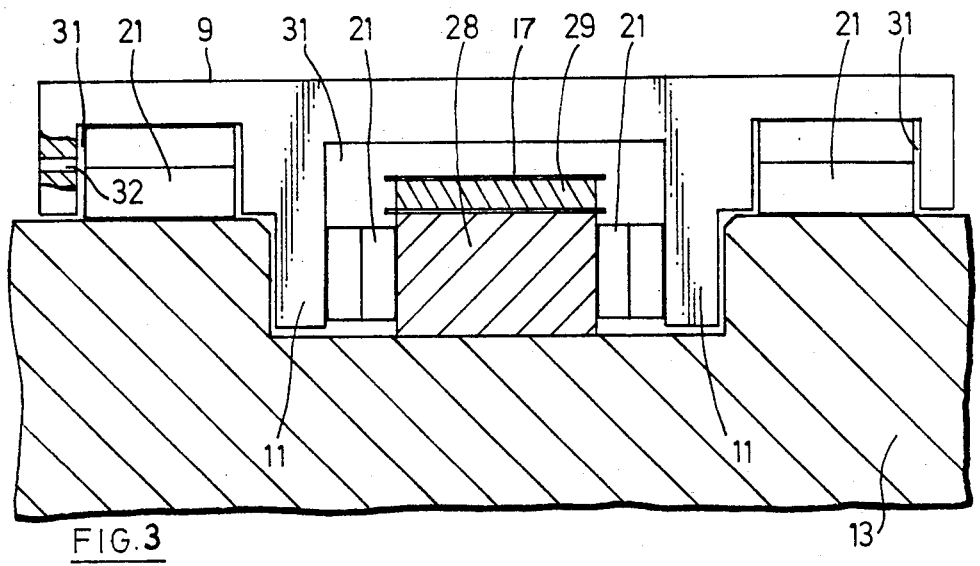
FIG. 3 shows a plan view of the carriage depicted in FIG. 2.
Figure 4:
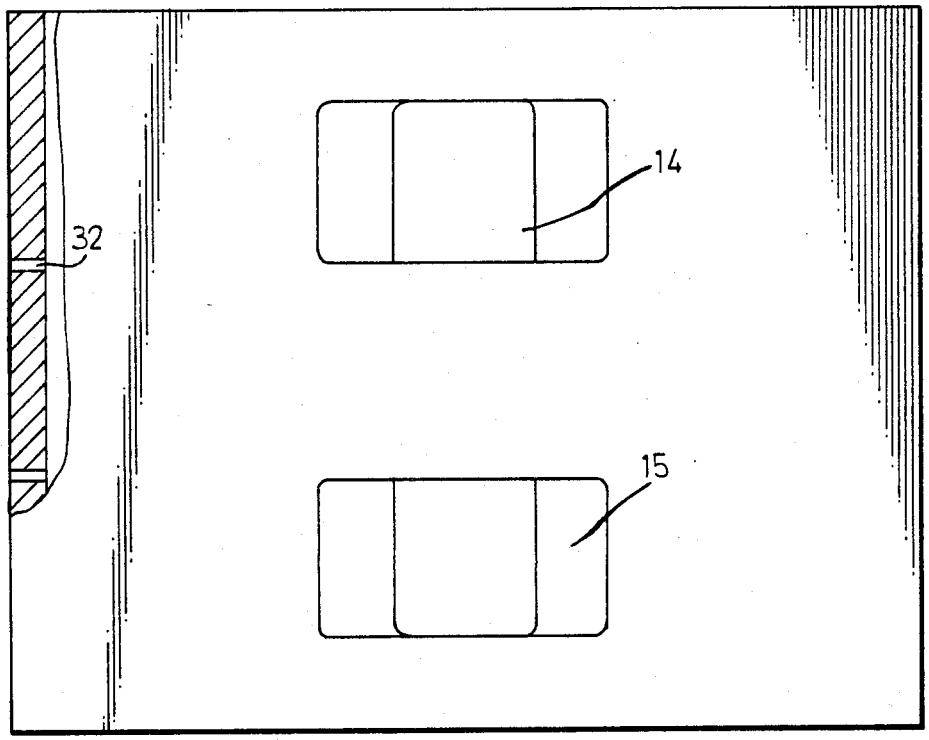
FIG. 4 is a cross-sectional view of the carriage shown in FIGS. 2 and 3.

Referring to FIGS. 3 and 4, the carriage 9 is connected to a source of compressed air (not shown) at about 4 kgs per square centimeter, by means of a very flexible tube. The weight of the carriage 9 precludes vertical deviations from its course. The lateral protrusions 11 of the carriage, equipped with pneumatic sliding bearings 21, allow a high-precision lateral guidance of the carriage 9, even with slight variations of the pressure in the bearings 21. Furthermore, slight vertical deviations from its course of the carriage 9 do not influence the beam projection spot on the drum 5. The pneumatic bearings 21 of the carriage 9 are connected to the air supply through the inlets 32.

The novel combination of pneumatic suspension and propulsion by means of a linear motor offers the following advantages:
it eliminates all static friction and mechanical hysteresis, and avoids transmission of mechanical vibrations from the drum 5 to the carriage 9,
it permits the use of a stable control algorithm devoid of limit cycles.

Figure 5:
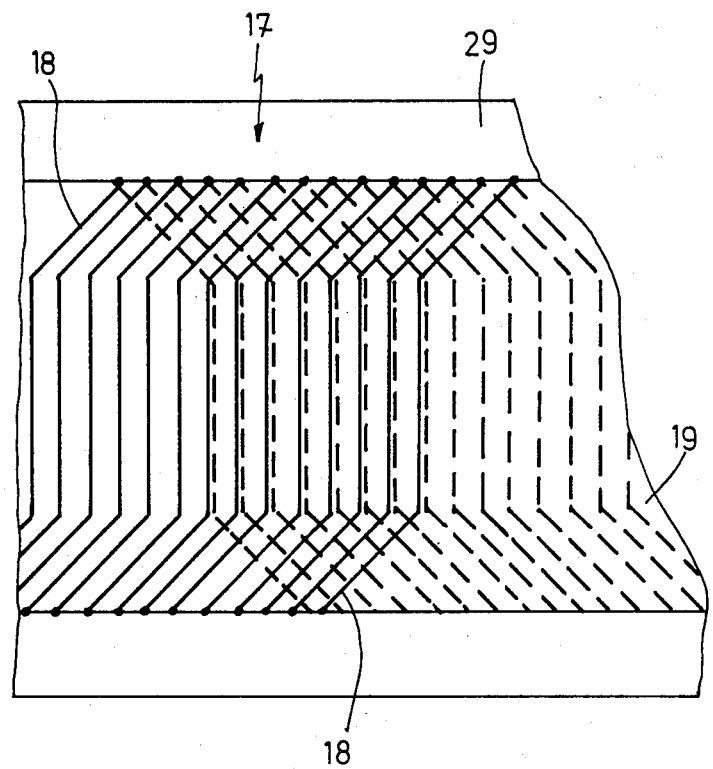
FIG. 5 is a schematic view of a particular realization of the linear motor winding of the automatic scanning device of the invention.

In the particular realization shown in FIG. 5, the winding 17 is realized by etching a thin epoxy board (possibly flexible), doubly clad with approximately 70 micrometers of copper. Each winding loop consists of two identical S-shaped patterns 18 on both sides of the board.

In a preferred embodiment, the winding pitch equals 25.4 millimeters or one inch. A back iron 29 with a thickness of 1 centimeter, preferably made of a soft magnetic material with high permeability such as e.g. soft iron, closes the flux path of the magnetic field generated by the magnets 14 and 15 of the carriage 9. The relative permeability of the back iron should be greater than 1,000. Therefore, a relatively small field strength suffices to generate a sufficiently strong induction. The operation of the linear motor, like all electric motors, rests upon the interaction between a magnetic field and a conductor through which a current flows.

In the preferred embodiment, the individual winding loops are dimensioned so as to allow continuous operation at current levels of 5 Amperes. With a pole area of 25.4 by 50 millimeters, an air gap of 0.5 millimeters yielding a field strength of 0.2 Tesla, the force exerted onto the carriage at a winding current of 5 Amperes is of the order of 1 Newton. The electric time constant of the winding is smaller than 1 millisecond. As a matter of fact, a low winding time constant is required to achieve the desired positioning accuracy.

During operation, the linear motor generates very little heat, allowing a good dimensional stability of the whole. The above linear motor achieves a positioning accuracy of about 2 micrometers at typical translation speeds of 1 millimeter per second. Meanwhile, the same linear motor can move as fast as 10 centimeters per second.

The control computer 25 measures the actual carriage characteristics, and adapts the coefficients of the control algorithm to these data.

In a particular realization, the winding 17 consists of 5 separate loops, each connected to a solid state commutator, with a pitch equaling the pole pitch (FIG. 5). This winding structure allows control of the magnitude and the sign of the velocity of the carriage by inverting the current through individual winding loops at precise instants in time.

It is obvious that the present invention is not limited to the above details, and that numerous alterations can be made without leaving the framework of the invention.

We claim:

1. An automatic scanning device for the opto-mechanical processing of a substrate covered with photo-sensitive material, by means of optical components supported by a carriage moving along a rectilinear guide, comprising:
   a light source generating a light beam;
   optical means mounted on said carriage for guiding the beam generated by the source onto said substrate;
   control means;
   a position measuring device coupled to determine the position of the carriage and to provide such position information to the control means;
   a magnet coupled to the carriage; and
   a linear motor comprising a winding, composed of a number of isolated conductors, attached to said rectilinear guide orthogonally to the longitudinal axis of said guide, and connected to said control means through a controllable current source, and a solid-state commutator coupled to magnetically propel the carriage in a controlled fashion in accordance with current supplied to the winding from said controllable current source based on instructions from said control means.

2. A device according to claim 1, wherein said control means is a control computer.

3. A device according to claim 1, wherein said light source is a laser light source, and further comprising means for intensity modulating said laser light source to generate said light beam.

4. A device according to claim 1, wherein said substrate comprises a drum, rotating about its central axis.

5. A device according to claim 1, further comprising at least one contactless bearing to support said carriage.

6. A device according to claim 1, further comprising a pneumatic carriage support and guidance bearings for said carriage.

7. A device according to claim 1, wherein said rectilinear guide is comprised of a soft highly permeable magnetic material, and wherein said linear motor winding is comprised of a two-layer printed circuit board, bearing on both sides a repetitive pattern of S-shaped conductors, attached to said rectilinear guide through a thin layer of isolating material.

8. A device according to claim 1, wherein said position measuring device comprises an optical grating with a resolution of the order of 1 micrometer, and a detector transmitting its data to said control means.

9. A device according to claim 2, wherein said light souce is a laser light source, and further comprising means for intensity modulating said laser light source to generate said light beam.

10. A device according to claim 2, wherein said substrate comprises a drum, rotating about its central axis.

11. A device according to claim 2, further comprising at least one contactless bearing to support said carriage.

12. A device according to claim 2, further comprising a pneumatic carriage support and guidance bearings for said carriage.

13. A device according to claim 2, wherein said rectilinear guide is comprised of a soft highly permeable magnetic material, and wherein said linear motor winding is comprised of a two-layer printed circuit board, bearing on bith sides a repetitive pattern of S-shaped conductors, attached to said rectilinear guide through a thin layer of isolating material.

14. A device according to claim 2, wherein said position measuring device comprises an optical grating with a resolution of the order of 1 micrometer, and a detector transmitting its data to said control means.

15. A device according to claim 3, wherein said substrate comprises a drum, rotating about its central axis.

16. A device according to claim 4, further comprising at least one contactless bearing to support said carriage.

17. A device according to claim 16, further comprising a pneumatic carriage support and guidance bearings for said carriage.

18. An automatic scanning device for the opto-mechanical processing of a substrate covered with photo-sensitive material, said substrate comprising a drum rotating about its central axis, said processing being accomplished by means of optical components supported by a carriage moving along a rectilinear guide, comprising:
   a light source for generating a light beam;
   optical means mounted on said carriage for guiding the beam generated by the source onto said substrate;
   a control computer;
   a position measuring device coupled to determine the position of the carriage and to provide said position information to said control computer, said position measuring device comprising an optical grating and a detector transmitting its data to said control computer;
   a magnet coupled to said carriage; and
   a linear motor comprising a winding, composed of a number of isolated conductors, attached to said rectilinear guide orthogonally to the longitudinal axis of said guide, and connected to said control computer through a controllable current source, and a solid-state commutator coupled to magnetically propel the carriage in a controlled fashion in accordance with current supplied to the winding from said controllable current source based on instructions from said control computer, said linear motor winding further comprising a two-layer printed circuit board, bearing on both sides a repetitive pattern of S-shaped conductors, attached to said rectilinear guide through a thin layer of isolating material.

19. A method for controlling and steering the scanning for the opto-mechanical processing of a substrate covered with a photo-sensitive material utilizing an automatic scanning device having optical components supported by a carriage moving along a rectilinear guide, comprising:

generating a light beam;

guiding the light beam onto said substrate by optical means mounted on said carriage;

determining the position of said carriage and providing this positional information to a control means;

controlling the movement of the carriage utilizing a linear motor coupled to the control means through a controllable current source, said linear motor comprising a winding, composed of a number of isolated conductors, attached to said rectilinear guide orthogonally to the longitudinal axis of said guide, and connected to said control means through a controllable current source, and a solid-state commutator coupled to magnetically propel the carriage by magnetically coupling to a magnet mounted on said carriage in a controlled fashion in accordance with current supplied to the winding from said controllable current source based on instructions from said control means.

20. A method according to claim 19, wherein the carriage position is determined by using an optical grating with a resolution of the order of 1 micrometer and a detector transmitting its data to said control computer.

21. A method according to claim 19, wherein said conductors disposed orthogonally to the axis of said rectilinear guide are etched as a printed circuit onto a yoke of soft iron disposed on said rectilinear guide.

22. A method according to claim 21, wherein the winding is composed of a repetitive pattern of identical S-shaped curves, connected at their extremities by means of through-plating, so as to form a winding conductor.

23. A method according to claim 21, wherein the conductors of the printed circuit consist of a 70 micrometer metallization of copper or silver.

24. A method according to claim 21, wherein the winding is attached to the rectilinear guide by means of a thin isolating layer.

25. A method according to claim 24, wherein the winding is attached to the rectilinear guide by gluing.

* * * * *